US012602538B2

(12) United States Patent
Wang et al.

(10) Patent No.: US 12,602,538 B2
(45) Date of Patent: Apr. 14, 2026

(54) METHOD AND SYSTEM FOR EXEMPLAR LEARNING FOR TEMPLATIZING DOCUMENTS ACROSS DATA SOURCES

(71) Applicant: Xiaolin Wang, San Jose, CA (US)

(72) Inventors: Xiaolin Wang, San Jose, CA (US); Michael Rinehart, Pleasanton, CA (US)

(73) Assignee: Xiaolin Wang

( * ) Notice: Subject to any disclaimer, the term of this patent is extended or adjusted under 35 U.S.C. 154(b) by 253 days.

(21) Appl. No.: 18/067,086

(22) Filed: Dec. 16, 2022

(65) Prior Publication Data

US 2023/0196007 A1 Jun. 22, 2023

Related U.S. Application Data

(60) Provisional application No. 63/290,274, filed on Dec. 16, 2021.

(51) Int. Cl.
| | |
|---|---|
| *G06F 40/186* | (2020.01) |
| *G06F 40/194* | (2020.01) |
| *G06F 40/205* | (2020.01) |
| *G06F 40/216* | (2020.01) |
| *G06F 40/289* | (2020.01) |
| *G06N 5/022* | (2023.01) |
| *G06N 20/00* | (2019.01) |

(52) U.S. Cl.
CPC .......... *G06F 40/186* (2020.01); *G06F 40/194* (2020.01); *G06F 40/205* (2020.01); *G06F 40/216* (2020.01); *G06F 40/289* (2020.01); *G06N 5/022* (2013.01); *G06N 20/00* (2019.01)

(58) Field of Classification Search
CPC .... G06F 40/186; G06F 40/194; G06F 40/205; G06F 40/216; G06F 40/289; G06N 20/00; G06N 5/022
See application file for complete search history.

(56) References Cited

U.S. PATENT DOCUMENTS 7,272,594 B1 * 9/2007 Lynch ................... G06F 40/194
7,797,265 B2 9/2010 Brinker et al.
(Continued)

FOREIGN PATENT DOCUMENTS

EP 1650680 B1 12/2009

*Primary Examiner* — Samuel G Neway
(74) *Attorney, Agent, or Firm* — Jason C. Cameron

(57) ABSTRACT

A system and method for templatizing documents across data sources is disclosed. The system includes a scanner to scan a plurality of files to retrieve a plurality of textual content. The system includes a pre-processor module to refine an efficacy corresponding to the scanned plurality of files by using a classifier to identify textual content with a similar template. The system includes an extraction module to extract a plurality of common sequences and sub-sequences from the plurality of files. The system includes a ranking module to rank the plurality of common sequences and sub-sequences based on a score. The system includes a feature vector generating module to generate a feature vector from the plurality of common sequences and sub-sequences. The system includes a determining module to determine a threshold value for the classifier thereby developing the classifier automatically to search for positive files with similar templates in the organization.

16 Claims, 5 Drawing Sheets

(56) References Cited

U.S. PATENT DOCUMENTS

| | | | |
|---|---|---|---|
| 9,477,756 B1* | 10/2016 | Park | G06F 16/353 |
| 11,386,897 B2* | 7/2022 | Singh | G10L 15/22 |
| 2002/0106128 A1* | 8/2002 | Zlotnick | G06V 30/1444 |
| | | | 382/224 |
| 2008/0046441 A1* | 2/2008 | Wen | G06F 16/9027 |
| 2012/0041955 A1 | 2/2012 | Regev et al. | |
| 2016/0055376 A1* | 2/2016 | Koduru | G06V 30/412 |
| | | | 382/176 |
| 2018/0018316 A1* | 1/2018 | Bogdan | G06F 16/285 |
| 2020/0311414 A1 | 10/2020 | Enuka et al. | |
| 2020/0327172 A1* | 10/2020 | Coquard | G06F 16/9035 |
| 2022/0036063 A1* | 2/2022 | Bhuyan | G06V 30/416 |
| 2023/0196007 A1* | 6/2023 | Wang | G06F 40/186 |
| | | | 704/9 |

\* cited by examiner

100

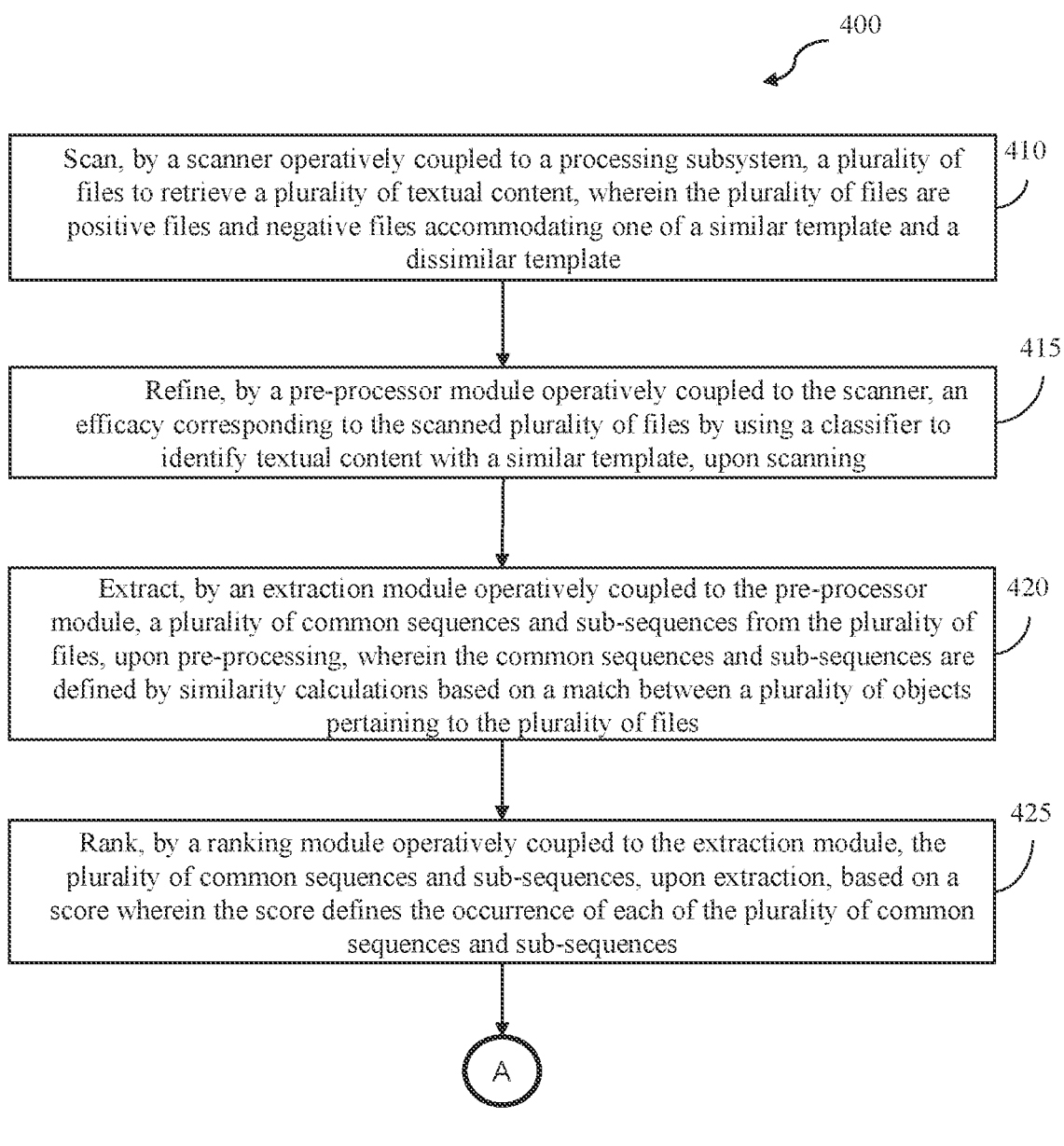

400

Scan, by a scanner operatively coupled to a processing subsystem, a plurality of files to retrieve a plurality of textual content, wherein the plurality of files are positive files and negative files accommodating one of a similar template and a dissimilar template

410

Refine, by a pre-processor module operatively coupled to the scanner, an efficacy corresponding to the scanned plurality of files by using a classifier to identify textual content with a similar template, upon scanning

415

Extract, by an extraction module operatively coupled to the pre-processor module, a plurality of common sequences and sub-sequences from the plurality of files, upon pre-processing, wherein the common sequences and sub-sequences are defined by similarity calculations based on a match between a plurality of objects pertaining to the plurality of files

420

Rank, by a ranking module operatively coupled to the extraction module, the plurality of common sequences and sub-sequences, upon extraction, based on a score wherein the score defines the occurrence of each of the plurality of common sequences and sub-sequences

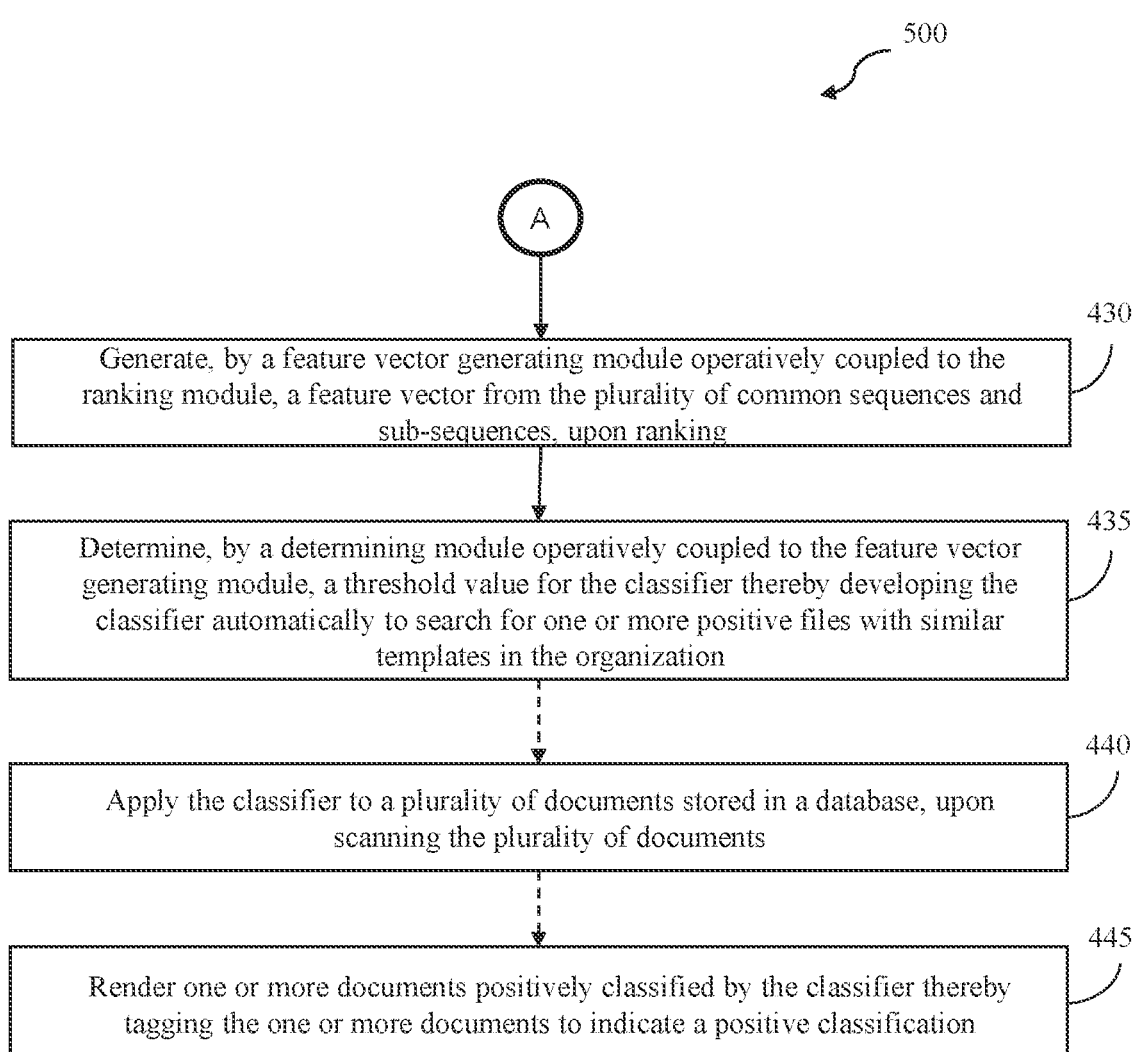

500

430

Generate, by a feature vector generating module operatively coupled to the ranking module, a feature vector from the plurality of common sequences and sub-sequences, upon ranking

435

Determine, by a determining module operatively coupled to the feature vector generating module, a threshold value for the classifier thereby developing the classifier automatically to search for one or more positive files with similar templates in the organization

440

Apply the classifier to a plurality of documents stored in a database, upon scanning the plurality of documents

445

Render one or more documents positively classified by the classifier thereby tagging the one or more documents to indicate a positive classification

FIG. 4b

METHOD AND SYSTEM FOR EXEMPLAR LEARNING FOR TEMPLATIZING DOCUMENTS ACROSS DATA SOURCES

EARLIEST PRIORITY DATE

This Application claims priority from a Provisional patent application filed in the United States of America having Patent Application No. 63/290,274, filed on Dec. 16, 2021, and titled "EXEMPLAR LEARNING FOR TEMPLA-TIZED DOCUMENTS ACROSS DATA SOURCES"

FIELD OF INVENTION

Embodiments of the present disclosure relate to the field of privacy management, and more particularly to a method and system for exemplar learning for templatizing documents across data sources.

BACKGROUND

A major challenge most enterprises face today in terms of privacy management is to understand how and where the customer's personal information is located across several data sources. Although certain search solutions have been incorporated to help organizations identify personal information stored in structured data, such solutions are not applicable well to unstructured and semi-structured documents (for instance, text files, portable document format files and the like). On the other hand, unstructured and semi-structured contents are ubiquitous in the modern business environment, where sensitive information (not necessarily personal information) could be generated via different applications, converted into various formats, and stored across multiple data centers. A failure to protect the information in unstructured and semi-structured documents from loss, theft, or abuse could lead to profitable markets and even criminal acts in the cyber economy.

Fortunately, many documents such as forms have certain templates that facilitate efficient processes in an organization. It is usually observed that these templatized documents tend to follow nearly the same structural pattern so that a similar amount of sensitive information could be generated and contained. However, building a solution for certain templatized documents can be challenging. Many existing platforms provide the ability to manually construct keyword-based classifiers. Moreover, due to the extreme size and complexity of modern data sources, the solution needs to be highly efficient while preserving high qualities so that the information of the underlying documents can be better analyzed. Further, the existing platforms fail to efficiently manage unstructured and semi-structured documents so that personal information can be better identified, understood, and protected.

Hence, there is a need for an improved system and method of exemplary learning for templatizing documents across data sources which addresses the aforementioned issue(s).

BRIEF DESCRIPTION

In accordance with an embodiment of the present disclosure, a system for exemplar learning for templatizing documents across data sources is provided. The system includes a processing subsystem hosted on a server and configured to execute on a network to control bidirectional communications among a plurality of modules. The processing subsystem includes a scanner configured to scan a plurality of files to retrieve a plurality of textual content, wherein the plurality of files are positive files and negative files accommodating one of a similar template and a dissimilar template. The processing subsystem also includes a pre-processor module operatively coupled to the scanner wherein the pre-processor module is configured to refine an efficacy corresponding to the scanned plurality of files by using a classifier to identify textual content with a similar template, upon scanning. The processing subsystem includes an extraction module operatively coupled to the pre-processor module wherein the extraction module is configured to extract a plurality of common sequences and sub-sequences from the plurality of files, upon pre-processing, wherein the common sequences and sub-sequences are defined by similarity calculations based on a match between a plurality of objects pertaining to the plurality of files, Further, the processing subsystem includes a ranking module operatively coupled to the extraction module wherein the ranking module is configured to rank the plurality of common sequences and sub-sequences, upon extraction, based on a score wherein the score defines the occurrence of each of the plurality of common sequences and sub-sequences. Furthermore, the processing subsystem includes a feature vector generating module operatively coupled to the ranking module wherein the feature vector generating module is configured to generate a feature vector from the plurality of common sequences and sub-sequences, upon ranking, Moreover, the processing subsystem includes a determining module operatively coupled to the feature vector generating module wherein the determining module is configured to determine a threshold value for the classifier thereby developing the classifier automatically to search for one or more positive files with similar templates in the organization.

In accordance with an embodiment of the present disclosure, a method for exemplar learning for templatizing documents across data sources is provided. The method comprises scanning, by a scanner operatively coupled to a processing subsystem, a plurality of files to retrieve a plurality of textual content, wherein the plurality of files are positive files and negative files accommodating one of a similar template and a dissimilar template, The method also comprises refining, by a pre-processor module operatively coupled to the scanner, an efficacy corresponding to the scanned plurality of files by using a classifier to identify textual content with a similar template, upon scanning. The method comprises extracting, by an extraction module operatively coupled to the pre-processor module, a plurality of common sequences and sub-sequences from the plurality of files, upon pre-processing, wherein the common sequences and sub-sequences are defined by similarity calculations based on a match between a plurality of objects pertaining to the plurality of files. Further, the method comprises ranking, by a ranking module operatively coupled to the extraction module, the plurality of common sequences and sub-sequences, upon extraction, based on a score wherein the score defines the occurrence of each of the plurality of common sequences and sub-sequences. Furthermore, the method comprises generating, by a feature vector generating module operatively coupled to the ranking module, a feature vector from the plurality of common sequences and sub-sequences, upon ranking. Moreover, the method comprises determining, by a determining module operatively coupled to the feature vector generating module, a threshold value for the classifier thereby developing the classifier automatically to search for one or more positive files with similar templates in the organization.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF TUE DRAWINGS

The disclosure will be described and explained with additional specificity and detail with the accompanying figures in which.

Figure 1:
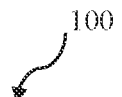
FIG. 1 is a block diagram representation of a system for exemplar learning for templatizing documents across data sources in accordance with an embodiment of the present disclosure.
Figure 1:
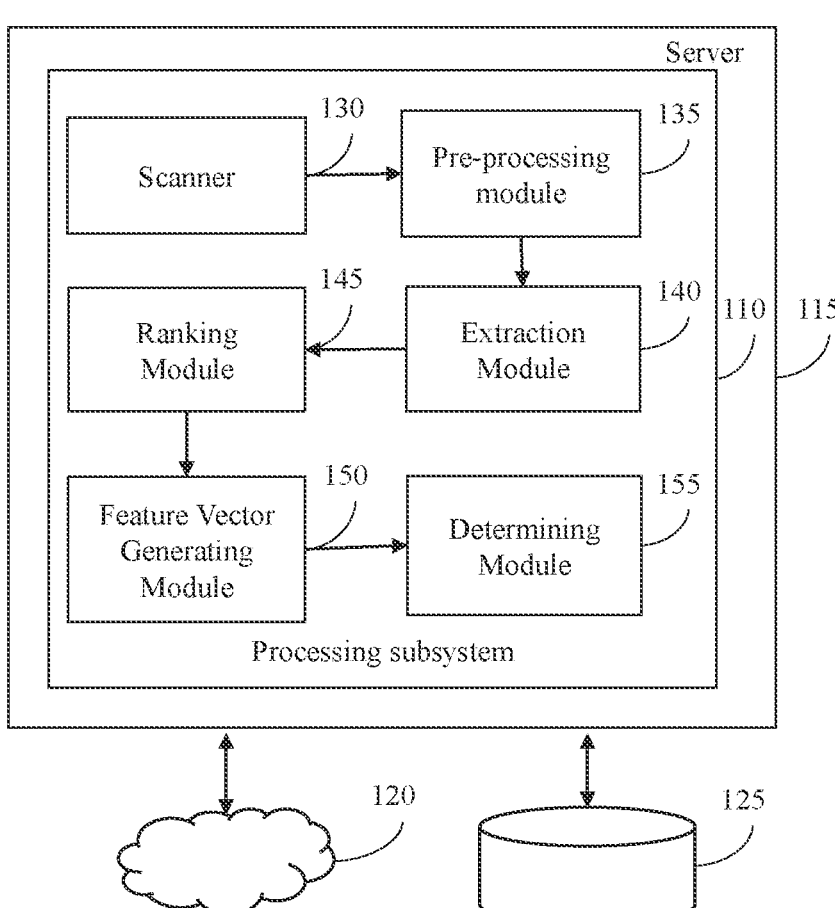

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or subsystems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

The term 'document' is used herein to refer to any data that includes textual contents. Examples of the textual contents include, but are not limited to, characters, words, sequences, and symbols.

In accordance with an embodiment of the present disclosure, a system for exemplar learning for templatizing documents across data sources is provided. The system includes a processing subsystem hosted on a server and configured to execute on a network to control bidirectional communications among a plurality of modules. The processing subsystem includes a scanner configured to scan a plurality of files to retrieve a plurality of textual content, wherein the plurality of files are positive files and negative files accommodating one of a similar template and a dissimilar template. The processing subsystem also includes a pre-processor module operatively coupled to the scanner wherein the pre-processor module is configured to refine an efficacy corresponding to the scanned plurality of files by using a classifier to identify textual content with a similar template, upon scanning. The processing subsystem includes an extraction module operatively coupled to the pre-processor module wherein the extraction module is configured to extract a plurality of common sequences and sub-sequences from the plurality of files, upon pre-processing, wherein the common sequences and sub-sequences are defined by similarity calculations based on a match between a plurality of objects pertaining to the plurality of files. Further, the processing subsystem includes a ranking module operatively coupled to the extraction module wherein the ranking module is configured to rank the plurality of common sequences and sub-sequences, upon extraction, based on a score wherein the score defines the occurrence of each of the plurality of common sequences and sub-sequences. Furthermore, the processing subsystem includes a feature vector generating module operatively coupled to the ranking module wherein the feature vector generating module is configured to generate a feature vector from the plurality of common sequences and sub-sequences, upon ranking. Moreover, the processing subsystem includes a determining module operatively coupled to the feature vector generating module wherein the determining module is configured to determine a threshold value for the classifier thereby developing the classifier automatically to search for one or more positive files with similar templates in the organization.

FIG. 1 is a block diagram representation of a system 100 for exemplar learning for templatizing documents across data sources in accordance with an embodiment of the present disclosure. The system 100 includes a processing subsystem 110. The processing subsystem 110 is hosted on a server 115. In one embodiment, the server 115 may be a cloud-based server. In another embodiment, the server 115 may be a local server. The processing subsystem 110 is configured to execute on a network 120 to control bidirectional communications among a plurality of modules. In one embodiment, the network 120 may include one or more terrestrial and/or satellite networks interconnected to communicatively connect a user device to web server engine and a web crawler. In one example, the network 120 may be a private or public local area network (LAN) or wide area network, such as the internet.

Moreover, in another embodiment, the network 120 may include both wired and wireless communications according to one or more standards and/or via one or more transport mediums. In one example, the network 120 may include wireless communications according to one of the 802.11 or Bluetooth specification sets, LoRa (Long Range Radio) or another standard or proprietary wireless communication protocol. In yet another embodiment, the network 120 may also include communications over a terrestrial cellular network, including, a GSM (global system for mobile communications), CDMA (code division multiple access), and/or EDGE (enhanced data for global evolution) network.

Further, the processing subsystem 110 is operatively coupled to a database 125 to store a plurality of documents in an organization. in a specific embodiment, the organization is a bank. In one embodiment, the database 125 may include, but not limited to, an SQL database, a non-SQL database, a hierarchical database, a columnar database and the like. In one embodiment, the data stored in the database 125 and can be used for several applications.

Furthermore, the processing subsystem 110 comprises a scanner 130, a pre-processing module 135, an extraction module 140, a ranking module 145, a feature vector generating module 150 and a determining module 155.

The scanner 130 is configured to scan a plurality of files to retrieve a plurality of textual content, wherein the plurality of tiles are positive files and negative files accommodating one of a similar template and a dissimilar template.

The preprocessing module 135 operatively coupled to the scanner wherein the pre-processor module is configured to refine an efficacy corresponding to the scanned plurality of files by using a classifier to identify textual content with a similar template, upon scanning. The classifier is trained with positive files and negative files using artificial intelligence. Examples of the artificial intelligence algorithm includes, but are not limited to, a Deep Neural Network (I)NN), Convolutional Neural Network (CNN), Restricted Boltzmann Machine (RBM), Deep Belief Network (DBN) and Deep Q-Networks.

The extraction module 140 is operatively coupled to the pre-processor module wherein the extraction module is configured to extract a plurality of common sequences and sub-sequences from the plurality of files, upon pre-processing, wherein the common sequences and sub-sequences are defined by similarity calculations based on a match between a plurality of objects pertaining to the plurality of files.

The ranking module 145 operatively coupled to the extraction module wherein the ranking module is configured to rank the plurality of common sequences and sub-sequences, upon extraction, based on a score wherein the score defines the occurrence of each of the plurality of common sequences and sub-sequences.

The feature vector generating module 150 operatively coupled to the ranking module wherein the feature vector generating module is configured to generate a feature vector from the plurality of common sequences and sub-sequences, upon ranking.

The determining module 155 coupled to the feature vector generating module wherein the determining module is configured to determine a threshold value for the classifier thereby developing the classifier automatically to search for one or more positive files with similar templates in the organization.

Figure 2:
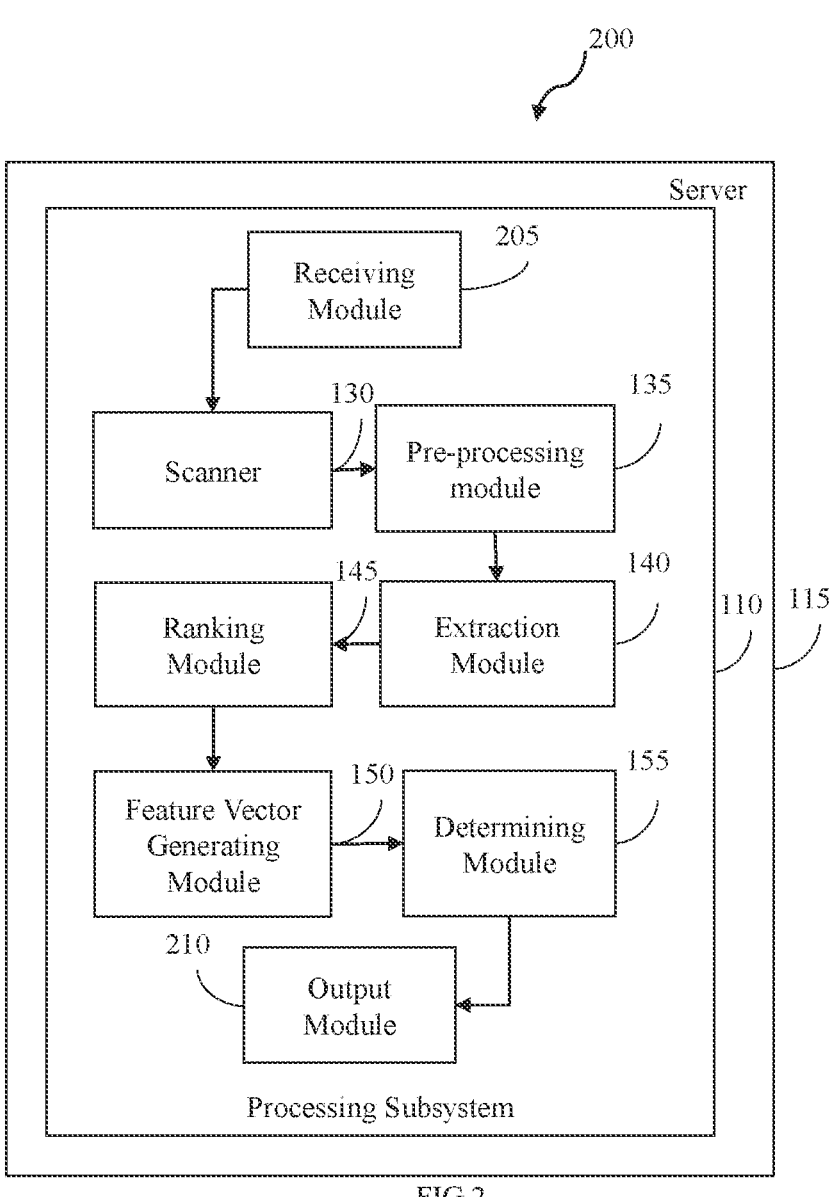
FIG. 2 is a block diagram representation of one embodiment of the system of FIG. 1, in accordance with an embodiment of the present disclosure.

FIG. 2 is a block diagram representation of one embodiment of the system of FIG. 1, in accordance with an embodiment of the present disclosure. The processing subsystem 110 of FIG. 1 includes the scanner 130, the pre-processing module 135, the extraction module 140, the ranking module 145, the feature vector generating module 150 and the determining module 155. In one embodiment, the processing subsystem 110 of FIG. 1 includes a receiving module 205 operatively coupled to the processing subsystem 110 wherein the receiving module 205 is configured to receive the plurality of files from a user pertaining to the organization.

Further, the processing subsystem 110 of FIG. I includes an output module 210 operatively coupled to the determining module 155 wherein the output module 210 is configured to render one or more documents positively classified by the classifier thereby tagging the one or more documents to indicate a positive classification.

Figure 3:
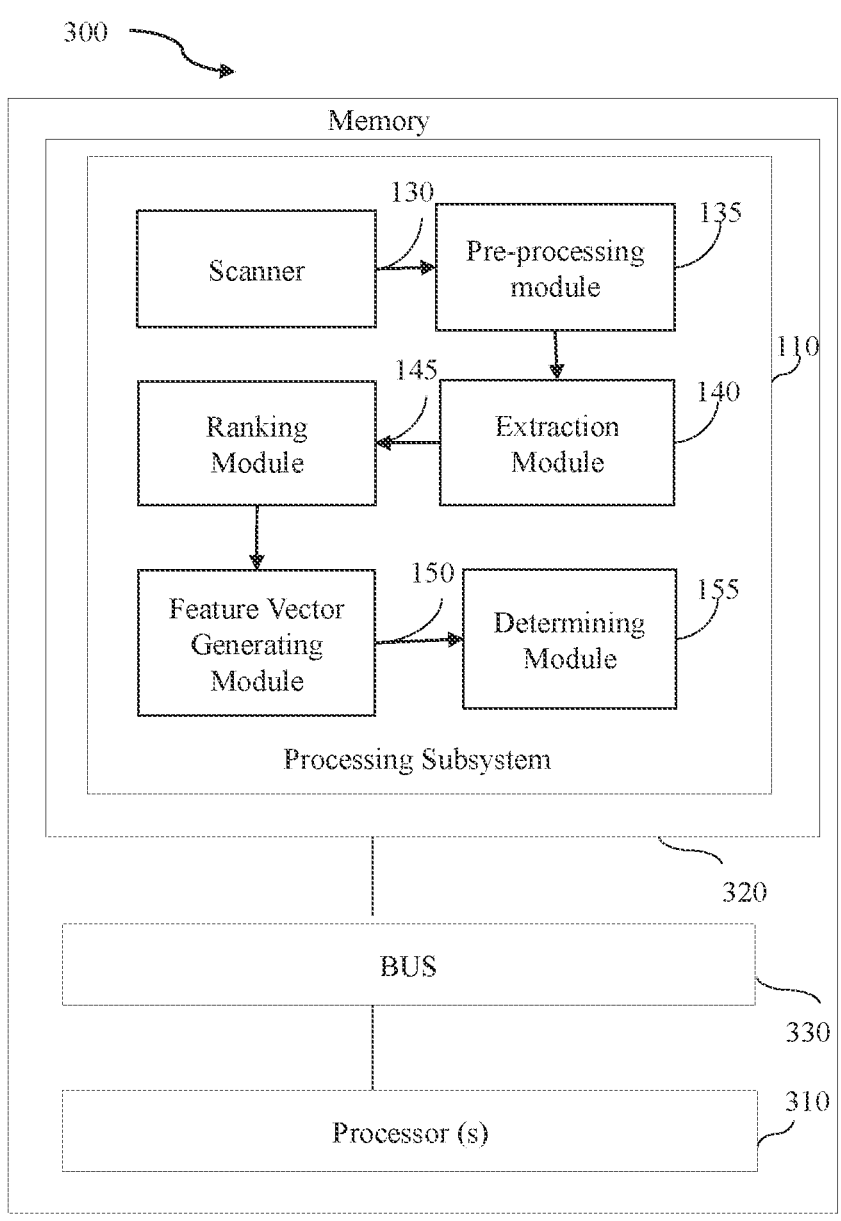
FIG. 3 is a block diagram of a computer or a server in accordance with an embodiment of the present disclosure; and FIG. 4a and FIG. 4b illustrates a flow chart representing the steps involved in a method for exemplar learning for templatizing documents across data sources in accordance with an embodiment of the present disclosure.

FIG. 3 is a block diagram of a computer or a server in accordance with an embodiment of the present disclosure. The server 300 includes processor(s) 310, and memory 320 operatively coupled to the bus 330. The processor(s) 310, as used herein, includes any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 320 includes several subsystems stored in the form of a computer-readable medium which instructs the processor to perform the method steps illustrated in FIG. I. The memory 320 is substantially similar to system 100 of FIG. The memory 320 has the following subsystems: the processing subsystem 110 including the scanner 130, the pre-processing module 135, the extraction module 140, the ranking module 145, the feature vector generating module 150 and the determining module 155. The plurality of modules of the processing subsystem 110 performs the functions as stated in FIG. 1 and FIG. 2. The bus 330 as used herein refers to be the internal memory channels or computer network that is used to connect computer components and transfer data between them. The bus 330 includes a serial bus or a parallel bus, wherein the serial bus transmit data in bit-serial format and the parallel bus transmit data across multiple wires. The bus 330 as used herein, may include but not limited to, a system bus, an internal bus, an external bus, an expansion bus, a frontside bus, a backside bus, and the like.

The processing subsystem 110 is hosted on a server and configured to execute on a network to control bidirectional communications among a plurality of modules. The processing subsystem 110 includes a scanner 130 configured to scan a plurality of files to retrieve a plurality of textual content, wherein the plurality of files are positive files and negative files accommodating one of a similar template and a dissimilar template. The processing subsystem 110 also includes a pre-processor module 135 operatively coupled to the scanner wherein the pre-processor module is configured to refine an efficacy corresponding to the scanned plurality of files by using a classifier to identify textual content with a similar template, upon scanning. The processing subsystem 110 includes an extraction module operatively coupled to the pre-processor module wherein the extraction module 140 is configured to extract a plurality of common sequences and sub-sequences from the plurality of files, upon preprocessing, wherein the common sequences and sub-sequences are defined by similarity calculations based on a match between a plurality of objects pertaining to the plurality of files. Further, the processing subsystem 110 includes a ranking module 145 operatively coupled to the extraction module wherein the ranking module is configured to rank the plurality of common sequences and sub-sequences, upon extraction, based on a score wherein the score defines the occurrence of each of the plurality of common sequences and sub-sequences. Furthermore, the processing subsystem 110 includes a feature vector generating module 150 operatively coupled to the ranking module wherein the feature vector generating module is configured to generate a feature vector from the plurality of common sequences and sub-sequences, upon ranking, Moreover, the processing subsystem 110 includes a determining module 155 operatively coupled to the feature vector generating module wherein the determining module is configured to determine a threshold value for the classifier thereby developing the classifier automatically to search for one or more positive files with similar templates in the organization.

While computer-readable medium is shown in an example embodiment to be a single medium, the term "computer-readable medium" should be taken to include a single medium or multiple media (for example, a centralized or distributed database, or associated caches and servers) able to store the instructions. The term "computer readable medium" shall also be taken to include any medium that is capable of storing instructions for execution by the machine and that cause the machine to perform any one or more of the methodologies disclosed herein. The term "computer-readable medium" includes, but not to be limited to, data repositories in the form of solid-state memories, optical media, and magnetic media.

In accordance with an embodiment of the present disclosure, a system for exemplar learning for templatizing documents across data sources is provided. The system includes a processing subsystem hosted on a server and configured to execute on a network to control bidirectional communications among a plurality of modules. The processing subsystem includes a scanner configured to scan a plurality of files to retrieve a plurality of textual content, wherein the plurality of files are positive files and negative files accommodating one of a similar template and a dissimilar template. The processing subsystem also includes a pre-processor module operatively coupled to the scanner wherein the pre-processor module is configured to refine an efficacy corresponding to the scanned plurality of files by using a classifier to identify textual content with a similar template, upon scanning. The processing subsystem includes an extraction module operatively coupled to the pre-processor module wherein the extraction module is configured to extract a plurality of common sequences and sub-sequences from the plurality of files, upon pre-processing, wherein the common sequences and sub-sequences are defined by similarity calculations based on a match between a plurality of objects pertaining to the plurality of files. Further, the processing subsystem includes a ranking module operatively coupled to the extraction module wherein the ranking module is configured to rank the plurality of common sequences and sub-sequences, upon extraction, based on a score wherein the score defines the occurrence of each of the plurality of common sequences and sub-sequences. Furthermore, the processing subsystem includes a feature vector generating module operatively coupled to the ranking module wherein the feature vector generating module is configured to generate a feature vector from the plurality of common sequences and sub-sequences, upon ranking. Moreover, the processing subsystem includes a determining module operatively coupled to the feature vector generating module wherein the determining module is configured to determine a threshold value for the classifier thereby developing the classifier automatically to search for one or more positive files with similar templates in the organization.

Computer memory elements may include any suitable memory device(s) for storing data and executable program, such as read only memory, random access memory, erasable programmable read only memory, electrically erasable programmable read only memory, hard drive, removable media drive for handling memory cards and the like. Embodiments of the present subject matter may be implemented in conjunction with program modules, including functions, procedures, data structures, and application programs, for performing tasks, or defining abstract data types or low-level hardware contexts. Executable program stored on any of the above-mentioned storage media may be executable by the processor(s) 310.

FIG. 4(*a*) illustrates a flow chart representing the steps involved in a method 400 for exemplary in accordance with an embodiment of the present disclosure. FIG. 4(*b*) illustrates continued steps of the method 400 of FIG. 4(*a*) in accordance with an embodiment of the present disclosure. The method begins at step 410.

At step 410, a plurality of files are scanned, by a scanner operatively coupled to a processing subsystem, to retrieve a plurality of textual content. The plurality of files are positive files and negative files accommodating one of a similar template and a dissimilar template.

As a pre-requisite, a collection of documents of positive files (for instance, 1-10) that have nearly the same template are received from a user. The user may or may not supply a collection of negative files that have templates different from the positive files. The method described herein aims at building a classifier that can identify all the documents with the same template.

It must be noted that the user may or may not provide the negative files.

In one embodiment, the user provides a collection of positive files that have similar categories that may have different templates. Further, the user may or may not supply a collection of negative files that have categories different from the positive files. In such an embodiment, an expanded exemplar learning approach is used to automatically build a classifier that can be used to search similar-type documents in the organization.

At step 415, an efficacy corresponding to the scanned plurality of files is refined by a pre-processor module operatively coupled to the scanner, using a classifier to identify textual content with a similar template, upon scanning the plurality of files.

After all the documents (received from the user) are scanned, the said documents are preprocessed to improve or refine the efficacy of the classifier. Typically, the preprocessing of the documents includes, but is not limited to, transforming document text to lowercase, removing non-alphanumeric characters, removing punctuation, removing excess whitespace, removing stop words, word stemming or lemmatization, keeping a fixed maximum length of text and so on.

For instance, the lowercase strings separated by certain terms are retained to maintain the structural characterization of the template. Examples of the lowercase strings include, but is not limited to, line break and excess whitespace. An exemplary positive file before and after pre-processing is illustrated below:

TABLE 1

Representation of a positive file before and after pre-processing.

Before Preprocessing

CLAIM FORM WELLNESS ACCOUNT
P.O. Box 10500, station Sainte-Foy, Quebec QC G1V 4H6
This form must be used for a claim related to expenses to wellness
activities. A detailed list of amounts eligible can be found in.
your insurance booklet. You must already have a wellness account
under your group insurance contract to use this form.
SECTION 1 - PARTICIPANT INFORMATION
SSQ Certificate No.
4589962

| Last Name | | First Name | |
| Cohen | | Austin | |
| Address | | | |
| 622 W 113th St | | | |
| Town/City | Province | Postal Code | Telephone Number |
| New York | NY | 10025 | 212-851-7800 |

Please note that the admissible fees are limited by the benefits
specifically included in your contract. Please consult your
brochure for more precisions concerning your coverage. The benefits
paid from your wellness account are taxable. The
payments will be taxed based on the year the claims were paid, not
on the year that the expenses were incurred.
SECTION 2 - CLAIM DETAIL
Noise-canceling headphones are very essential in a student's life
Brief description of claimed fees:
I can sit anywhere, in the park, inside the library, or even in my
small, crowded hostel room and
easily put on the headphones and concentrate on my work and meet my
deadlines timely. Instead
of telling people to mute themselves or talk softly, I can simply
mind my own business and continue After Preprocessing

```
{
    'claim form wellness account',
    'p.o. box 10500, station sainte-foy, quebec qc g1v 4h6',
    'this form must be used for claim related to expenses to
wellness activities. a detailed list of amounts eligible can be
found in',
    'your insurance booklet. you must already have a wellness
account under your group insurance contract to use this form.',
    'section 1 - participant information',
    'ssq certificate no.',
    'first name',
    '622 w 113th st',
    'postal code',
    'telephone number',
    '212-851-7800',
    'please note that the admissible fees are limited by the
benefits specifically included in your contract. please consult your',
    'brochure for more precisions concerning your coverage. the
benefits paid from your wellness account are taxable. the',
    'payments will be taxed based on the year the claims were paid,
not on the year that the expenses were incurred.',
    'section 2 - claim detail',
    'noise-canceling headphones are very essential in a student's life',
    'brief description of claimed fees',
    'i can sit anywhere, in the park, inside the library, or even
in my small, crowded hostel room and',
    'easily put on the headphones and concentrate on my work and
meet my deadlines timely. Instead',
    'of telling people to mute themselves or talk softly, i can
simply mind my own business and continue'
}
```

In one embodiment, expanded features are generated from pre-processed positive files. The possible expanded features include but are not limited to the following:

a The topic of the document: a set of topics may be pre-determined, and a classifier is built in advance to infer the topic of each document. Several topic techniques are considered to train the classifier. For instance, two positive files may have a common topic 'Health_Insurance_Form'.

b. A numeric feature vector of the document: one approach to generate a vector of numerical values is sentence embeddings. The sentence embeddings are a class of techniques where sentences can be represented as real-value numerical feature vectors in a predefined vector space. The feature vector may capture different aspects of the sentence, and each sentence is associated with one point in the vector space. The number of features is much smaller than the size of the vocabulary. Properly learned sentence embeddings could allow the sentences that are used in a similar way to have similar representations and naturally indicate their meaning. There are many pre-trained sentence encoders that can be directly re-used, such as fastText, BERT, Universal Sentence Encoder and the like. A sentence encoding model can be trained or fine-tuned based on some predetermined dataset. The positive examples that have similar embeddings may be grouped together as a partition.

c. A set of key words or phrases of the document: All the words and short phrases in the positive examples may be ranked according to a score function, and we may extract the top k candidates. The score may be defined such that the words/phrases with a higher score that are more unique in the positive examples than in any other documents. Also, the document in the positive examples should have a much higher score than that in the negative examples (if any). The ranking may be conducted among different partitions of the positive examples, so that each partition could have its own set of key words/phrases.

At step 420, a plurality of common sequences and sub-sequences from the plurality of files are extracted, by an extraction module operatively coupled to the pre-processor module.

The common sequences are extracted from the pre-processed positive files. If there is only one positive file, step 420 is not performed, and the preprocessed positive file is considered as the set of common sequences. If there are more than two positive files, all common sequences and sub-sequences are obtained. Therefore, it must be noted that the documents with the same template should have a certain number of common sequences that can be leveraged.

Further, the common sequences may be defined by similarity calculations based on exact or partial match. The exact match is used to determine whether two objects are identical while a partial match aims to identify the same partial objects or similar objects. Accordingly, a suitable encoding technique may be executed before the matching process. Examples of the encoding techniques include, but are not limited to:

a Retaining the exact string of each sequence and performing a match on the string pairs. For example, for an exact match, compare all the characters in the strings, and for a partial match, compare some consecutive characters in the strings so that common subsequences can be identified.

b. Applying cryptographic hash algorithms to each sequence and performing a match on the hash values. For a partial match, an advanced hashing scheme may be used to hash the sequences into buckets so that objects in each of the buckets are similar with a high probability. The advanced hashing scheme may facilitate identification of observations with certain degrees of robustness and similarity.

Referring to Table 1, a partial match is performed on the exact strings. For given two strings, longest (sub)sequences are identified. For instance, consider string A as 'Alice likes watching TV at home' and string B as 'Bob likes watching TV before sleep'. The longest (sub) sequences is too short (for example, less than 10 characters), they may be removed.

Consequently, all the positive examples or a random subset is taken, and the common sequences present in all the selected examples are extracted. This could be achieved by solving pairwise Longest Common (Sub)sequence (LCS) and looping over every example. More advanced techniques may be deployed to improve the extraction efficiency (for instance, apply locally sensitive hashing to precluster the sequences and then perform pairwise LCS within each cluster). An illustration of part of the positive examples in the case study before and after extraction of common sequences is shown below in Table 2.

TABLE 2

Representation of positive files before
and after extraction of common sequences.

Before Extraction

Positive Example 1:
{
    'claim form wellness account',
    'p.o. box 10500, station sainte-foy, quebec qc g1v 4h6',
    'this form must be used for claim related to expenses to wellness activities. a detailed list of amounts eligible can be found in',
    'your insurance booklet. you must already have a wellness account under your group insurance contract to use this form.',
    'section 1 - participant information',
    'ssq certificate no.',
    'first name',
    '622 w 113th st',
    'postal code',
    'telephone number',
    '212-851-7800',
    'please note that the admissible fees are limited by the benefits specifically included in your contract. please consult your',
    'brochure for more precisions concerning your coverage. the benefits paid from your wellness account are taxable. the',
    'payments will be taxed based on the year the claims were paid, not on the year that the expenses were incurred.',
    'section 2 - claim detail',
    'noise-canceling headphones are very essential in a student's life',
    'brief description of claimed fees',
    'i can sit anywhere, in the park, inside the library, or even in my small, crowded hostel room and',
    'easily put on the headphones and concentrate on my work and meet my deadlines timely. Instead',
    'of telling people to mute themselves or talk softly, i can simply mind my own business and continue'
}
Positive Example 2:
{
    'claim form wellness account',
    'p.o. box 10500, station sainte-foy, quebec qc g1v 4h6',
    'this form must be used for claim related to expenses to wellness activities. a detailed list of amounts eligible can be found in',
    'your insurance booklet. you must already have a wellness account under your group insurance contract to use this form.',
    'section 1 - participant information',
    'ssq certificate no.',
    'first name',
    '407 valley st',
    'postal code',
    'telephone number',
    'south orange',
    '(740)653-2631',
    'please note that the admissible fees are limited by the

TABLE 2-continued

Representation of positive files before
and after extraction of common sequences.

benefits specifically included in your contract. please consult your',
    'brochure for more precisions concerning your coverage. the benefits paid from your wellness account are taxable. the',
    'payments will be taxed based on the year the claims were paid, not on the year that the expenses were incurred.',
    'section 2 - claim detail',
    'as you know, on december 01, 2020. i was very seriously injured in',
    'brief description of claimed fees',
    'an automobile collision also there was accidental damage to my car. i, therefore, request the',
    'company to pay for the require as covered by my medical insurance. the hospital i was admitted to',
    'just sent me the final bill from my recent accident, the bill shoes that your insurance only covers'
}

After Extraction

Common Sequences:
{
    'claim form wellness account',
    'p.o. box 10500, station sainte-foy, quebec qc g1v 4h6',
    'this form must be used for claim related to expenses to wellness activities. a detailed list of amounts eligible can be found in',
    'your insurance booklet. you must already have a wellness account under your group insurance contract to use this form.',
    'section 1 - participant information',
    'ssq certificate no.',
    'first name',
    'postal code',
    'telephone number',
    'please note that the admissible fees are limited by the benefits specifically included in your contract. please consult your',
    'brochure for more precisions concerning your coverage. the benefits paid from your wellness account are taxable. The',
    'payments will be taxed based on the year the claims were paid, not on the year that the expenses were incurred.',
    'section 2 - claim detail',
    'brief description of claimed fees'
}

At step 425, the plurality of common sequences and sub-sequences are ranked upon extraction based on a score wherein the score defines the occurrence of each of the plurality of common sequences and sub-sequences. Typically, the score is based on a score function.

An exemplary score function is to combine and compare the properties of the whole sequence and its own tokens. For example, denote sequence A has n tokens ($\alpha_1$, $\alpha_2$, . . . , $\alpha_n$, then the score of A is defined as:

$$s(A) = \left[ \min_{i=1,\ldots,n} r(a_i) \right] \times len(A) \times tf_{positive} \times idf_{negative} \tag{1}$$

len calculates the total number of characters in sequence A. This is assumed that the longer the sequence is, the more unique it appears in the positive examples. Other measures, such as the total number of tokens in sequence A, may also be used.

$$tf_{positive} = \frac{N^A_{positive}}{N_{positive}} \tag{2}$$

$tf_{positive}$ is the positive term frequency, which calculates the frequency of sequence A present in the positive examples. There are many other ways to define it, but we may use the raw count for now.

$$idf_{negative} = \log \frac{2 + N_{negative}}{1 + N_{negative}^A} \qquad (3)$$

$idf_{negative}$ is the negative inverse document frequency, which measures the logarithmically scaled inverse fraction of the negative examples (if given) that contain sequence A. Again, we may use the raw count for now. wherein r is a rank function of the token.

The more common the token, the higher the rank. This could be obtained by measuring and comparing the frequency of a token. For instance, the token 'the' may have the highest rank in English.

Table 3 illustrates a part of the positive files before and after ranking of common sequences.

---

Before Ranking

---

{
  'claim form wellness account',
  'p.o. box 10500, station sainte-foy, quebec qc g1v 4h6',
  'this form must be used for claim related to expenses to
wellness activities. a detailed list of amounts eligible can be found in',
  'your insurance booklet. you must already have a wellness
account under your group insurance contract to use this form.',
  'section 1 - participant information',
  'ssq certificate no.',
  'first name',
  'postal code',
  'telephone number',
  'please note that the admissible fees are limited by the
benefits specifically included in your contract. please consult your',
  'brochure for more precisions concerning your coverage. the
benefits paid from your wellness account are taxable. The',
  'payments will be taxed based on the year the claims were paid,
not on the year that the expenses were incurred.',
  'section 2 - claim detail',
  'brief description of claimed fees'
}

---

After Ranking

---

[
  'this form must be used for claim related to expenses to
wellness activities. a detailed list of amounts eligible can be found in',
  'payments will be taxed based on the year the claims were paid,
not on the year that the expenses were incurred.',
  'your insurance booklet. you must already have a wellness
account under your group insurance contract to use this form.',
  'please note that the admissible fees are limited by the
benefits specifically included in your contract. please consult your',
  'brochure for more precisions concerning your coverage. the
benefits paid from your wellness account are taxable. the',
  'brief description of claimed fees',
  'p.o. box 10500, station sainte-foy, quebec qc g1v 4h6',
  'claim form wellness account',
  'section 2 - claim detail',
  'section 1 - participant information',
  'last name',
  'first name',
  'telephone number',
  'postal code',
  'ssq certificate no.',
  'town/city'
]

---

At step 430, a feature vector is generated from the plurality of common sequences and sub-sequences, by a feature vector generating module operatively coupled to the ranking module, upon ranking.

Specifically, the feature vector is generated from the ranked sequences for the positive files. The feature vector is any function that is applied to the sequences, such as an autoencoder, a hashing scheme and the like. The resulting vector includes numerical, string and the like. In one embodiment, the feature vector is stored in a database and is associated with the positive examples from where it was determined.

Referring to the ongoing example, the exact text is used and a predetermined number of sequences having the highest ranks is selected. More specifically, the feature vector is just the first k ranked sequences where k is a predetermined number. This k-dimensional vector may represent the template of the positive examples. It is to be noted that, not every document in the positive examples may have all the k sequences from the feature vector but should have most of them for best performance Referring to Table 3 as an example, a 10-d feature vector would look like Table 4 as illustrated below:

---

[
  'this form must be used for claim related to expenses to
wellness activities. a detailed list of amounts eligible can be found in',
  'payments will be taxed based on the year the claims were paid,
not on the year that the expenses were incurred.',
  'your insurance booklet. you must already have a wellness
account under your group insurance contract to use this form.',
  'please note that the admissible fees are limited by the
benefits specifically included in your contract. please consult your',
  'brochure for more precisions concerning your coverage. the
benefits paid from your wellness account are taxable. the',
  'brief description of claimed fees',
  'p.o. box 10500, station sainte-foy, quebec qc g1v 4h6',
  'claim form wellness account',
  'section 2 - claim detail',
  'section 1 - participant information'
]

---

Table 4 is an illustration of a feature vector

At step 435, a threshold value for the classifier is determined, by a determining module operatively coupled to the feature vector generating module, thereby developing the classifier automatically to search for one or more positive files with similar templates in the organization. The threshold value is used as a reference by the user.

After step 410 and step 415, each document is encoded into a representation vector based on the feature vector. The representation vector may be an N-dimensional vector of numerical features representing a document, where N is a predetermined number. There are many ways for encoding documents into numerical values. In a specific embodiment, a binary encoding technique is used: If a sequence from the feature vector is found in the document, the corresponding entry is 1. Otherwise, it is set to 0. Referring to the ongoing example illustrated in Table 4, the feature vector in Table 4 as an example, one positive document may have a representation vector [1, 1, 1, 1, 1, 1, 1, 1, 1, 1], while one negative document could result in a representation vector [0, 0, 0, 0, 0, 0, 0, 0, 1, 0].

It will be appreciated to those skilled in the art that any other advanced encoding technique may be used, for instance an autoencoder, a hashing scheme and the like.

In one embodiment, the similarity between the representation vector and feature vector is calculated. There are several ways to calculate the similarity between vectors, such as the cosine similarity, Jaccard similarity, some similarity derived from a machine learning model, and so on. For the binary encoded vectors, the normalized L1 distance, or Manhattan distance can be used as the similarity score. Referring back to the feature vector in Table 4 as an example, one positive document may have a similarity score of 1.0 while one negative document could result in a similarity score of 0.1.

Subsequently, all or some of the positive, negative, and internal negative examples are incorporated to train an internal classifier to determine the critical examples. The classifier is robust to noise during the process (if one or more positive files are found in the negative examples or vice versa).

In one embodiment, a soft margin classifier is built (for example, support vector machine) to find the critical examples. This will allow some points in the training data to violate the separating line. For the example of Table 4, if we have a positive set with similarity scores of [1, 1, 0.9, 0,9] and a negative set with similarity scores of [0.1, 0, 0.2, 0.9], then the resulting critical values from the internal classifier may be 0.9 for positive case and 0.2 for negative case.

Finally, the default threshold may be designed to maximize the margin between the positive and negative examples, but any selection process meeting some objective can be applied. For example, the middle point between the critical values may be used. If the critical values are 0.9 for positive case and 0.2 for negative case, the default threshold would be 0.55. Finally, the default threshold may be stored and associated with the positive examples from which it was determined for further processes.

In one embodiment, each document is scanned, preprocessed and examined with the expanded features to determine whether or not it is a similar type with at least one of the positive files. Depending on the selected level of resolution, the similarity may be considered according to:

a Whether or not two documents have the same topic if the topic feature is present.

b. Whether or not two documents are similar in their numeric vector space. There are many ways to calculate the similarity between vectors, such as the cosine similarity, normalized L1 distance, some similarity derived from a machine learning model and so on. A threshold may be entertained and associated with the selected level to arbitrate similarity.

c. Whether or not a document has enough keywords or phrases from one of the positive examples or partitions. A threshold may be entertained and associated with the selected level to arbitrate sufficiency, For each document, it is first examined to find which criteria above are met with respect to one of the positive examples. The examined results are listed below:

1. Does the document have the same topics as one of the positive examples

2. Is the document similar to one of the positive examples in their numeric vector space, 3. The similarity score between the document and the positive example 4. Does the document have a sufficient number of keywords/phrases from one of the positive examples or partitions 5. Number of keywords/phrases present in the document These results are then sent to a classifier to classify whether this document is similar to the positive files.

It must be noted that once the classifier is built, the following step 440 and step 445 may be applied in the system.

At step 440, the classifier is applied to a plurality of documents stored in a database, upon scanning the plurality of documents.

In this step, the feature vector and default threshold may be presented to the platform for the user to view. The user may examine the feature vector and default threshold, and then may modify. Once it is fixed, all or some documents stored by an organization is searched across various unstructured and semi-structured data sources. The said documents may be accessed over a network or the like. Each document may be scanned, preprocessed, and examined with the feature vector to calculate the similarity score. If the similarity score is larger than the threshold, the document will be classified as positive. Otherwise, it will be rejected. All the positive documents may be stored for further processes.

At step 445, the one or more documents positively classified by the classifier is rendered thereby tagging the one or more documents to indicate a positive classification.

Finally, after the search process, output all or some of the searched documents is rendered to the user. In one embodiment, the resulting clusters is rendered with the associated threshold and information about the documents within the cluster via a user interface. For example, the system may present the statistics associated with the cluster, such as the similarity score of each document within the cluster, the size of the cluster, the content topic of the cluster, the distribution of the documents across different data centers, the quantities and properties of personal data found in the cluster and the like.

The steps from 410-445 aim at retrieving identical templated documents. It must be noted that said steps are expanded to retrieve similar documents across data sources within the organization. This way of expansion provides a very low-cost, high-efficacy approach to generate a classifier using very few documents to aid organizations or enterprises to retrieve similar documents from several data sources. Further, this way is useful when the user is unable to provide more than a few documents for training.

The method ends at step 445.

Various embodiments of the system and method for exemplary learning for templatizing documents across data sources described above enable various advantages. A computer-implemented framework is introduced that identifies and explores documents into coherent, organized, and analytical units to allow hidden templatized patterns to emerge from unstructured and semi-structured data sources. The framework is designed to be efficient and to allow for better understanding of massive data environments. Moreover, the units produced by the framework can form a useful basis for further processes, such as data discovery applications and data subject access requests.

The computer-implemented framework further provides various advantages, for instance, easily applicable to several languages, low memory during scanning, high speed during scanning, eliminates the requirement of expensive hardware to build the classifier, generating a highly interpretable and modifiable classifier and providing a flexible framework that can facilitate different solutions in each stage.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. A system for exemplar learning for templatizing documents across data sources comprising:

a processing subsystem hosted on a server and configured to execute on a network to control bidirectional communications among a plurality of modules comprising:

a scanner configured to scan a plurality of files to retrieve a plurality of textual content, wherein the plurality of files are positive files and negative files accommodating one of a similar template and a dissimilar template;

a pre-processor module operatively coupled to the scanner wherein the pre-processor module is configured to refine an efficacy corresponding to the scanned plurality of files by using a classifier, trained with positive files and negative files using artificial intelligence technique, wherein the artificial intelligence technique comprises at least one of a Deep Neural Network (DNN), Convolutional Neural Network (CNN), Restricted Boltzmann Machine (RBM), Deep Belief Network (DBN), Deep Q-Networks or a combination thereof, to identify textual content with a similar template, upon scanning;

an extraction module operatively coupled to the pre-processor module wherein the extraction module is configured to extract a plurality of common sequences and sub-sequences from the plurality of files, upon pre-processing, wherein the common sequences and sub-sequences are defined by similarity calculations based on a match between a plurality of objects pertaining to the plurality of files, wherein the match is one of an exact match to determine if the plurality of objects are identical and a partial match to determine if the plurality of objects are partially similar, wherein the extraction module comprises applying cryptographic hash techniques to each sequence and performing a match on the hash values, and for a partial match using an advanced hashing scheme including locally sensitive hashing (LSH) to hash the sequences into buckets so that objects in each of the buckets are similar with a high probability;

a ranking module operatively coupled to the extraction module wherein the ranking module is configured to rank the plurality of common sequences and sub-sequences, upon extraction, based on a score wherein the score defines the occurrence of each of the plurality of common sequences and sub-sequences, wherein the score is based on a score function wherein the score function is applied to each of the plurality of sequences thereby ranking the said plurality of sequences;

a feature vector generating module operatively coupled to the ranking module wherein the feature vector generating module is configured to generate a feature vector from the plurality of common sequences and sub-sequences, upon ranking, wherein the feature vector is generated using sentence embeddings including at least one of fastText, Bidirectional Encoder Representations from Transformers (BERT), or Universal Sentence Encoder, or an autoencoder, a hashing scheme, or a combination thereof; and a determining module operatively coupled to the feature vector generating module wherein the determining module is configured to determine a threshold value for the classifier thereby developing the classifier automatically to search for one or more positive files with similar templates in an organization.

2. The system of claim 1 wherein the classifier is applied to a plurality of documents stored in a database, upon scanning the plurality of documents.

3. The system of claim 1 comprising:

a receiving module operatively coupled to the processing subsystem wherein the receiving module is configured to receive the plurality of files from a user pertaining to the organization; and an output module operatively coupled to the determining module wherein the output module is configured to render one or more documents positively classified by the classifier thereby tagging the one or more documents to indicate a positive classification.

4. The system of claim 1 wherein the plurality of files are encoded prior to the extraction of the set of common sequences.

5. The system of claim 1 comprising:

applying the classifier to search for a plurality of documents stored in a database corresponding to the organization from a plurality of data sources via the network, wherein the data sources are unstructured data sources and semi-structured data sources; and rendering the plurality of documents, upon searching, to the user via a user interface.

6. The system of claim 1 wherein the classifier is developed using artificial intelligence.

7. A method for exemplar learning for templatizing documents across data sources comprising:

scanning, by a scanner operatively coupled to a processing subsystem, a plurality of files to retrieve a plurality of textual content, wherein the plurality of files are positive files and negative files accommodating one of a similar template and a dissimilar template;

refining, by a pre-processor module operatively coupled to the scanner, an efficacy corresponding to the scanned plurality of files by using a classifier trained with positive files and negative files using artificial intelligence technique, wherein the artificial intelligence technique includes at least one of a Deep Neural Network (DNN), Convolutional Neural Network (CNN), Restricted Boltzmann Machine (RBM), Deep Belief Network (DBN), Deep Q-Networks, or a combination thereof, to identify textual content with a similar template, upon scanning;

extracting, by an extraction module operatively coupled to the pre-processor module, a plurality of common sequences and sub-sequences from the plurality of files, upon pre-processing, wherein the common sequences and sub-sequences are defined by similarity calculations based on a match between a plurality of objects pertaining to the plurality of files, wherein the match is one of an exact match for determining if the plurality of objects are identical and a partial match for determining if the plurality of objects are partially similar;

applying cryptographic hash techniques to each sequence and performing a match on the hash values, and for a partial match using an advanced hashing scheme including locally sensitive hashing (LSH) for hashing the sequences into buckets so that objects in each of the buckets are similar with a high probability;

ranking, by a ranking module operatively coupled to the extraction module, the plurality of common sequences and sub-sequences, upon extraction, based on a score wherein the score defines the occurrence of each of the plurality of common sequences and sub-sequences;

generating, by a feature vector generating module operatively coupled to the ranking module, a feature vector from the plurality of common sequences and sub-sequences, upon ranking, wherein the score is based on a score function wherein the score function is applied to each of the plurality of sequences thereby ranking the said plurality of sequences;

generating, by the feature vector generating module operatively coupled to the ranking module, a feature vector from the plurality of common sequences and sub-sequences, upon ranking, wherein the feature vector is generated using sentence embeddings including at least one of fastText, Bidirectional Encoder Representations from Transformers (BERT), or Universal Sentence Encoder, or an autoencoder, a hashing scheme, or a combination thereof; and determining, by a determining module operatively coupled to the feature vector generating module, a representation vector of each document based on the feature vector, wherein the representation vector is a predetermined number of dimensional vectors representing a plurality of features of the documents; a similarity score between the representation vector and the feature vector using at least one of cosine similarity, Jaccard similarity, normalized L1 distance, or Manhattan distance; and a threshold value for the classifier by building a soft margin classifier (support vector machine) to find critical examples and designing the threshold to maximize the margin between positive and negative examples thereby developing the classifier automatically to search for one or more positive files with similar templates in an organization.

8. The method of claim 7 comprising:

receiving, by a receiving module of the processing sub-system, the plurality of files from a user pertaining to the organization; and rendering, by an output module operatively coupled to the determining module, one or more documents positively classified by the classifier thereby tagging the one or more documents to indicate a positive classification.

9. The method of claim 7 wherein the documents with similar templates comprise of a pre-set number of common sequences and sub-sequences.

10. The method of claim 7 wherein the user is allowed to modify the feature vector and the threshold value for the classifier.

11. The method of claim 7 wherein the feature vector is stored in a database with corresponding positive files from where it was determined.

12. The method of claim 7 wherein the classifier is applied to search for one or more documents stored in the organization via a network, across a plurality of unstructured data source and semi-structured data source and wherein upon searching, the documents are classified as positive files if a corresponding similarity score is larger than the threshold value of the classifier.

13. The method of claim 7 wherein one or more features are generated from the pre-processed positive documents thereby expanding the frequency of documents thereby quantifying the similarity between the documents.

14. The method of claim 7 wherein the positive and negative files are incorporated to train the classifier.

15. The method of claim 7 wherein the classifier is expanded to retrieve similar documents from a plurality of data sources.

16. The method of claim 15 wherein the similar documents have different templates.

* * * * *